United States Patent
Witt, Jr. et al.

(10) Patent No.: US 9,981,625 B2
(45) Date of Patent: May 29, 2018

(54) AIRBAG MOUNTING BRACKET

(71) Applicants: John F Witt, Jr., Clinton Township, MI (US); David W. Schneider, Waterford, MI (US); Matthew R. Reschke, Royal Oak, MI (US); Jeffrey E. Low, Layton, UT (US)

(72) Inventors: John F Witt, Jr., Clinton Township, MI (US); David W. Schneider, Waterford, MI (US); Matthew R. Reschke, Royal Oak, MI (US); Jeffrey E. Low, Layton, UT (US)

(73) Assignee: AUTOLIV ASP, INC., Ogden, UT (US)

(*) Notice: Subject to any disclaimer, the term of this patent is extended or adjusted under 35 U.S.C. 154(b) by 0 days. days.

(21) Appl. No.: 15/053,037

(22) Filed: Feb. 25, 2016

(65) Prior Publication Data
US 2017/0247008 A1 Aug. 31, 2017

(51) Int. Cl.
*B60R 21/213* (2011.01)
*B60R 21/232* (2011.01)
*B60R 21/231* (2011.01)
*B21C 23/02* (2006.01)

(52) U.S. Cl.
CPC ............ *B60R 21/213* (2013.01); *B21C 23/02* (2013.01); *B60R 21/232* (2013.01); *B60R 21/23138* (2013.01); *B60R 2021/23192* (2013.01)

(58) Field of Classification Search
CPC ............ B60R 21/213; B60R 21/23138; B60R 21/232; B60R 2021/23192; B21C 23/02; B23B 41/16
See application file for complete search history.

(56) References Cited

U.S. PATENT DOCUMENTS

| 3,978,705 | A | * | 9/1976 | Pearce | B21D 22/04 72/325 |
| 4,441,300 | A | * | 4/1984 | Varon | E04B 2/7863 211/182 |
| 5,398,379 | A | * | 3/1995 | Kiefer | E05D 3/022 16/364 |
| 6,889,999 | B2 | * | 5/2005 | Dominissini | B60R 21/201 280/730.2 |

(Continued)

FOREIGN PATENT DOCUMENTS

| EP | 2 112 031 A1 | 10/2009 |
| EP | 2 112 033 A1 | 10/2009 |

(Continued)

*Primary Examiner* — Darlene P Condra
(74) *Attorney, Agent, or Firm* — Pauley Erickson & Kottis (57) ABSTRACT

Methods for making an airbag mounting bracket for use with an attachment component of an associated airbag cushion are provided. An opening in a mounting bracket precursor formed of a bracket precursor material is extruded. A rounded surface of the bracket precursor material adjacent the extruded opening is formed. The mounting bracket precursor with the rounded surface is subsequently finalized to form the airbag cushion mounting bracket, wherein the extruded opening provides an airbag attachment engagement opening for passage of the attachment component and the rounded surface provides a load bearing surface of increased area for the attachment component. Also provided are corresponding or associated airbag mounting brackets.

20 Claims, 9 Drawing Sheets

(56) References Cited

U.S. PATENT DOCUMENTS

| | | | |
|---|---|---|---|
| 7,516,978 B2* | 4/2009 | Quach | B60R 21/213 280/730.2 |
| 7,695,000 B2* | 4/2010 | Jang | B60R 21/213 24/265 R |
| 7,823,914 B2 | 11/2010 | Cheal et al. | |
| 8,820,779 B1* | 9/2014 | Low | B60R 21/232 280/728.2 |
| 9,487,175 B2* | 11/2016 | Noma | B60R 21/201 |
| 2004/0026901 A1* | 2/2004 | Yann | B60R 21/213 280/727 |
| 2005/0011057 A1* | 1/2005 | Dominssini | B60R 21/233 24/570 |
| 2008/0284142 A1 | 11/2008 | Cheal et al. | |
| 2009/0184494 A1* | 7/2009 | Dominissini | B60R 21/217 280/728.2 |
| 2011/0025034 A1* | 2/2011 | Lim | B60R 21/207 280/743.2 |
| 2011/0057422 A1 | 3/2011 | Cheal et al. | |
| 2011/0215556 A1* | 9/2011 | Higano | B60R 21/213 280/730.2 |
| 2012/0119048 A1* | 5/2012 | Kim | B60R 21/213 248/309.1 |
| 2014/0265272 A1* | 9/2014 | Takeuchi | B60R 21/213 280/730.2 |
| 2015/0239416 A1 | 8/2015 | Markusic | |
| 2017/0165896 A1* | 6/2017 | Wallace | B29C 51/306 |

FOREIGN PATENT DOCUMENTS

| | | |
|---|---|---|
| EP | 2 910 432 A1 | 8/2015 |
| JP | 2009-90712 | 4/2009 |
| JP | 2014-189039 | 10/2014 |
| WO | WO 2012/063702 A1 | 5/2012 |
| WO | WO 2014/014191 A1 | 1/2014 |
| WO | WO 2014/061452 A1 | 4/2014 |

* cited by examiner

AIRBAG MOUNTING BRACKET

BACKGROUND OF THE INVENTION

Field of the Invention

This invention relates generally to automotive occupant safety systems such as airbag installations for automotive vehicles and, more particularly, to mounting systems and components of such systems and the manufacture thereof.

Discussion of Related Art

It is well known to protect a vehicle occupant by means of safety restraint systems which self-actuate from an undeployed or static state to a deployed state without the need for intervention by the operator, i.e., "passive restraint systems." Such systems commonly contain or include an inflatable vehicle occupant restraint or element, such as in the form of a cushion or bag, commonly referred to as an "airbag cushion." In practice, such airbag cushions are typically designed to rapidly inflate or expand with gas when the vehicle encounters a sudden deceleration, such as in the event of a collision.

Such airbag cushions may desirably deploy into one or more locations within the vehicle between the occupant and certain parts of the vehicle interior, such as the doors, steering wheel, instrument panel or the like, to prevent or avoid the occupant from forcibly striking such parts of the vehicle interior. For example, typical or customary vehicular airbag cushion installation locations have included in the steering wheel, in the dashboard on the passenger side of a car, along the roof line of a vehicle such as above a vehicle door, and in the vehicle seat such as in the case of a seat-mounted airbag cushion. Other airbag cushions such as in the form of knee bolsters and overhead airbags can also operate or serve to protect other specific or particular various parts of an occupant's body from collision. In the case of a front airbag, for example, the cushion portion is accommodated in the center of a steering wheel in a folded state. In the case of a curtain airbag, for example, the cushion portion is typically accommodated in the vicinity of an upper portion of a side door in a rolled state in a roll form.

The cushion portion in an accommodated state is preferably maintained in a desired folded or rolled state. For example, in the case of a front airbag cushion installation, since the cushion portion is accommodated in a housing that also functions as a horn switch, the accommodated form is maintained. On the other hand, in the case of a curtain airbag cushion, since the cushion portion has an elongated shape, the cushion portion may typically not have a dedicated housing capable of accommodating the entire cushion portion and the accommodated form thereof is maintained using a tape or the like device or feature.

For example, WO 2014/061452 A1 and its European counterpart, European Patent Application Publication EP 2 910 432 A1, disclose an airbag that includes a cushion portion that is accommodated in a long and narrow form at least in part through the use a device termed a "mounting bracket," or, more specifically a "hanger bracket" or, more simply, a "hanger" or "bracket."

Figure 1:
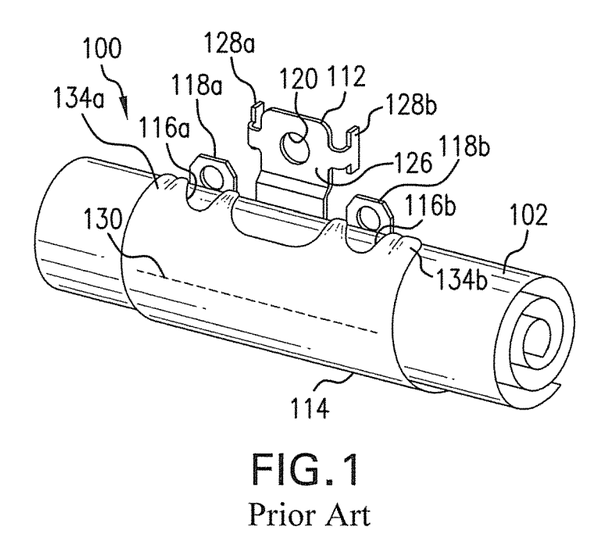
FIG. 1 is a perspective view of a known a curtain airbag assembly.
Figure 2:
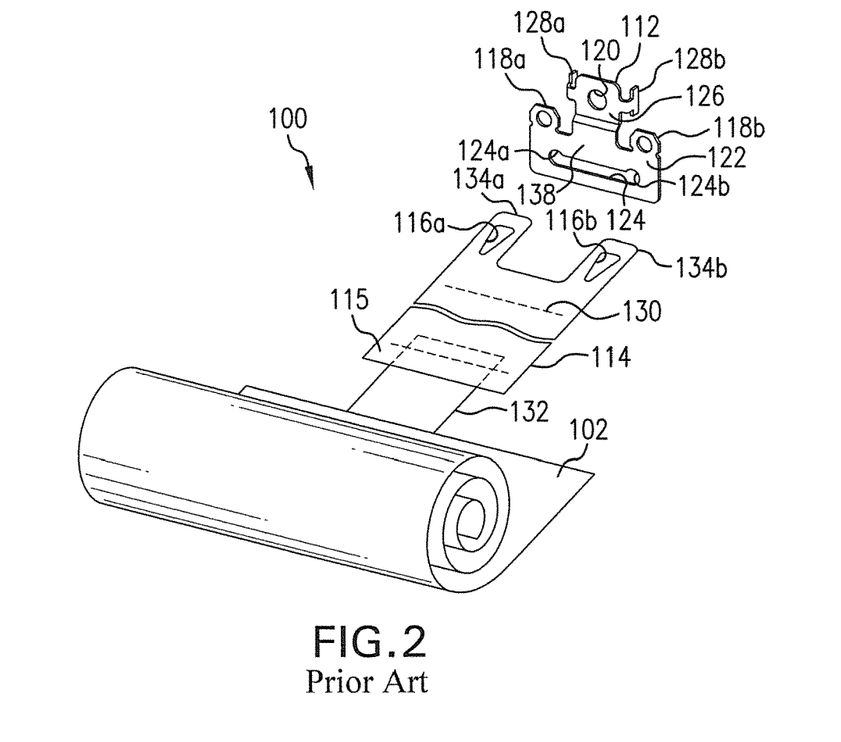
FIG. 2 is a partially exploded view of the curtain airbag assembly shown in FIG. 1.

FIGS. 1 and 2 illustrate a curtain airbag assembly 100 such as including a cushion portion 102.

The cushion portion 102 is a portion that is inflated and deployed in an emergency situation to protect an occupant. The cushion portion 102 is rolled and accommodated in a narrow and long form in a front-rear direction of a vehicle and is mounted such as by being attached to a wall (e.g., a roof side rail) above a side surface of a vehicle interior. In general, since the roof side rail is commonly covered by a roof trim, the accommodated cushion portion 102 is not visible from the vehicle interior. Although the accommodated form of the cushion portion 102 of this particular illustrated embodiment is realized by winding, the accommodated form may be alternatively be realized by folding or the like, for example.

Typically, a plurality of hanger brackets 112 are provided in an upper portion of the airbag assembly so as to attach the cushion portion 102 to the vehicle. The bracket 112 is typically a metal member and is fixed to the roof side rail after being connected to or with the cushion portion 102.

A wrapping member 114 has a root portion 115 which is sewn or otherwise connected to a fabric tab connector 132 on an upper edge of the cushion portion 102. Hooking holes 116a and 116b are formed in both ends in a width direction of a distal end of the wrapping member 114. After the wrapping member 114 is wrapped, when the hooking holes 116a and 116b are hooked on protruding portions 118a and 118b of the bracket 112, respectively, the cushion portion 102 in the accommodated form is connected to the bracket 112 as illustrated in FIG. 1.

The bracket 112 is commonly formed by applying bending processing or the like to a planar metal. A bolt hole 120 is formed in the bracket 112, and a bolt (not illustrated) passes through the bolt hole 120 whereby the bracket 112 is appropriately fastened to the vehicle, such as to the roof side rail (not shown).

The bracket 112 includes a base portion 122 provided in a lower part of the bracket 112 and has a horizontally long insertion hole 124. The fabric tab 132 passes through the insertion hole 124 and is typically sewn to itself near the bracket 112 and then ultimately sewn or otherwise appropriately connected to or with the cushion. Both ends 124a and 124b in the longitudinal direction of the insertion hole 124 have an upwardly curved shape whereby the concentration of stress when a load is applied from the wrapping member 114, for example, can be alleviated and the occurrence of cracks or the like avoided or prevented.

A vehicle fixing portion 126 extends upward from the base portion 122 in a rectangular shape. The above-described bolt hole 120 and hooking portions 128a and 128b are formed in the vehicle fixing portion 126, and the hooking portions 128a and 128b are formed in lateral edges in the width direction so as to face the vehicle side. The hooking portions 128a and 128b are positioning portions used when attaching the bracket 112 and can desirably be inserted, such as in the vehicle roof side rail, before the bolt is fastened into the bolt hole 120.

The protruding portions 118a and 118b are formed on both sides in the width direction of the vehicle fixing portion 126 in an upper portion of the base portion 122. The protruding portions 118a and 118b have such a shape that protrudes upward from the base portion 122, and the hooking holes 116a and 116b of the wrapping member 114 are hooked on the protruding portions 118a and 118b.

In this embodiment, as illustrated in FIG. 1, the wrapping member 114 is wrapped around the cushion portion 102 and the bracket 112 in order to maintain the accommodated form of the cushion portion 102 and to connect the cushion portion 102 and the bracket 112. The wrapping member 114 is formed of a breakable material so that the wrapping member 114 breaks with inflation and deployment of the cushion portion 102 so as to open the cushion portion 102. A broken line-shaped slit 130 may be formed in the wrapping member 114 as a weak portion so that breaking occurs smoothly.

As identified above, the root portion 115 of the wrapping member 114 can be sewn or otherwise connected to the fabric tab 132 on the upper edge of the cushion portion 102. Projecting pieces 134a and 134b are formed on a distal end side of the wrapping member 114 on both ends in the width direction, and the hooking holes 116a and 116b are formed in the projecting pieces 134a and 134b, respectively.

Known hanger brackets are typically employed or used with fabric material thicknesses of 1-3 mm or larger for strength as well as to increase the load bearing surface to help prevent or avoid fabric tab tearing during loading. Hanger brackets employed for fabric tab attachment such as used to secure an inflatable curtain airbag to a vehicle and which brackets have a smaller cross sectional area have typically required coining, cold forming, de-burring, and/or coating, to remove or avoid sharp edges that could potentially damage fabric tabs during deployment or throughout their life cycle prior to deployment.

Due to the increased loading on mounting and mounting/hanger brackets due to highly pressurized curtain airbag designs to satisfy evolving regulations, prior art bracket designs may be prone to or can more likely result in tearing of the fabric mounting tabs of the associated airbag cushion. That is, increased frequency and severity of tearing may occur or be experienced due to the increased loading and interaction between the tab and edge of the bracket (which edge is typically less than 3 mm thick).

SUMMARY OF THE INVENTION

A general object of the invention is to provide an improved method for making an airbag mounting bracket.

Another general object of the invention is to provide an improved airbag mounting bracket.

A more specific objective of the invention is to overcome one or more of the problems described above.

In accordance with one aspect of the invention a method for making an airbag mounting bracket for use with an attachment component of an associated airbag cushion is provided.

In one embodiment, such a method includes extruding an opening in a mounting bracket precursor formed of a bracket precursor material. Adjacent the extruded opening, a rounded surface of the bracket precursor material is formed. The mounting bracket precursor with the rounded surface is subsequently finalized to form the airbag cushion mounting bracket, wherein the extruded opening provides an airbag attachment engagement opening for passage of the attachment component and the rounded surface provides a load bearing surface of increased area for the attachment component.

In accordance with one aspect of the invention, a method for making a side airbag inflatable curtain mounting bracket is provided.

In one embodiment, such a method includes extruding an opening in a mounting bracket precursor formed of a bracket precursor material. A rounded surface of the bracket precursor material is formed adjacent the extruded opening. The mounting bracket precursor with the rounded surface is subsequently finalized to form the side airbag inflatable curtain mounting bracket, wherein the extruded opening provides a side airbag attachment engagement opening for passage of the attachment component and the rounded surface provides a load bearing surface of increased area for the attachment component. The side airbag inflatable curtain mounting bracket can alternatively appropriately be a side airbag inflatable curtain hanger bracket or a side airbag inflatable curtain tether anchor.

Other objects and advantages will be apparent to those skilled in the art from the following detailed description taken in conjunction with the appended claims and drawings.

DETAILED DESCRIPTION OF THE INVENTION

In accordance with one aspect of the invention, there is provided an improved method for making an airbag mounting bracket.

In accordance with another aspect of the invention, there is provided an improved airbag mounting bracket.

Figure 3:
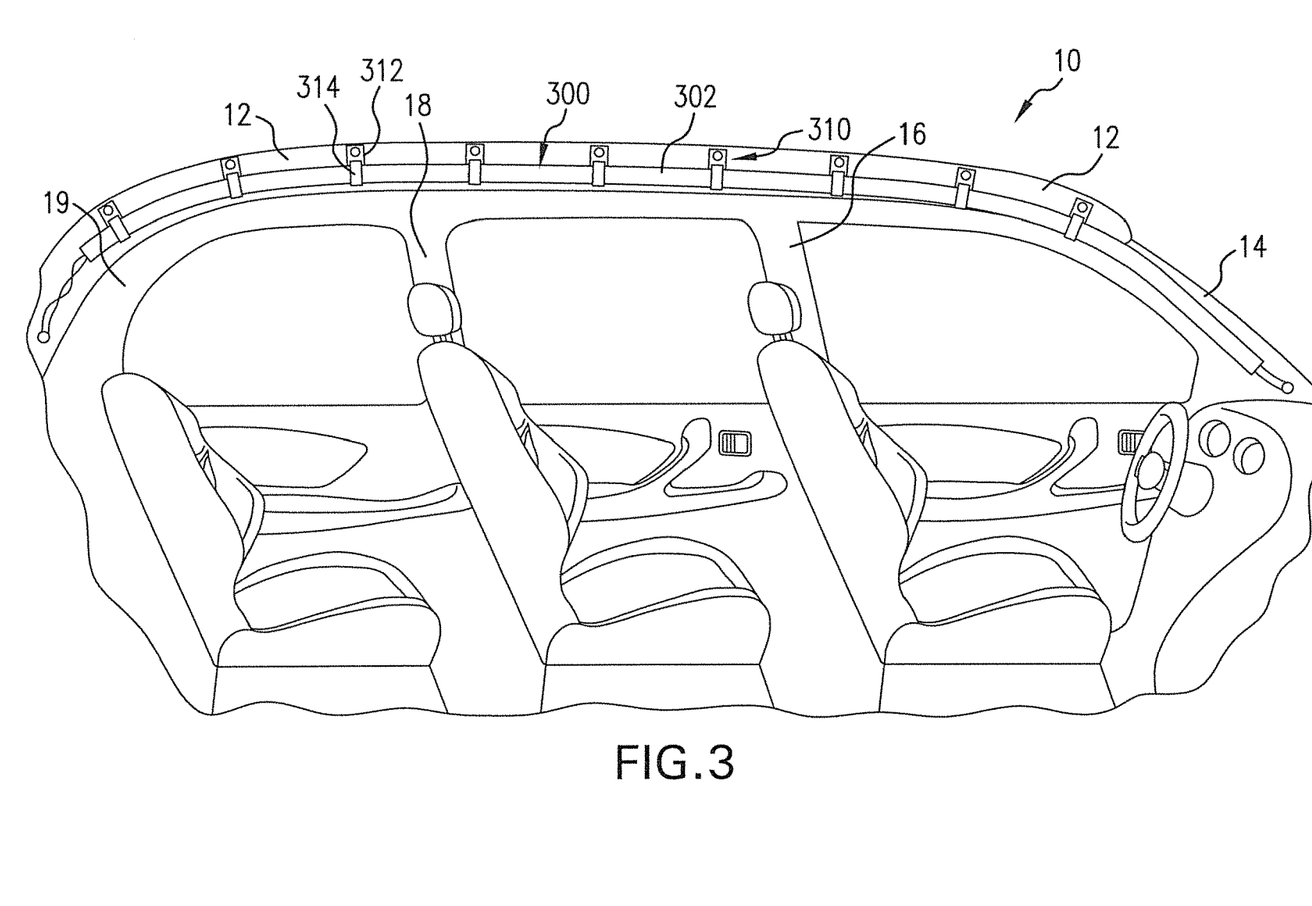
FIG. 3 is a perspective view of an interior of a vehicle showing an airbag mounting assembly coupled to an inflatable curtain airbag in an undeployed configuration.

Turning to FIG. 3, there is shown an airbag assembly 300 such as including an inflatable curtain airbag 302 and an airbag mounting assembly 310. Alternative embodiments, such as front, side, overhead, and knee airbags may be used.

Inflatable curtain airbag 302 of FIG. 3 is mounted inside a vehicle 10 adjacent to roof rail 12. Inflatable curtain airbag 302 includes a mounting surface, which may comprise the top edge of inflatable curtain airbag 302, which is mounted adjacent roof rail 12. Inflatable curtain airbag 302 may extend from A-pillar 14 to D-pillar 19 to provide impact protection for passengers sitting along the side structure of vehicle 10. In alternative embodiments, the inflatable curtain airbag may only extend a portion of the distance from A-pillar 14 to D-pillar 19, such as from A-pillar 14 to B-pillar 16 or from A-pillar 14 to C-pillar 18.

Inflatable curtain airbag 302 includes inflatable chambers (not shown), which are in fluid communication with an inflator (not shown). During a collision scenario, the inflator may rapidly inflate the inflatable curtain airbag 302, which may adopt an extended/deployed configuration (see FIG. 4 which shows an inflatable curtain airbag in an inflated state within a vehicle).

FIG. 3 depicts inflatable curtain airbag 302 in an undeployed configuration. One embodiment of airbag mounting assembly 310 couples inflatable curtain airbag 302 to roof rail 12. Airbag mounting assembly 310 may comprise mounting bracket 312, a connecting member (not specifically shown), and a wrapping member 314. Mounting bracket 312 may be fastened to roof rail 12 by bolting, welding, gluing, riveting, screwing, pinning or the like.

FIG. 3 depicts airbag mounting assembly 310 attached adjacent roof rail 12. In other embodiments, airbag mounting assembly may be attached to other structures within a vehicle, such that airbag assembly can be located at various locations within a vehicle, including, but not limited to, the steering wheel, the instrument panel, within the side doors or side seats, in an overhead position, or at the knee or leg position.

Figure 4:
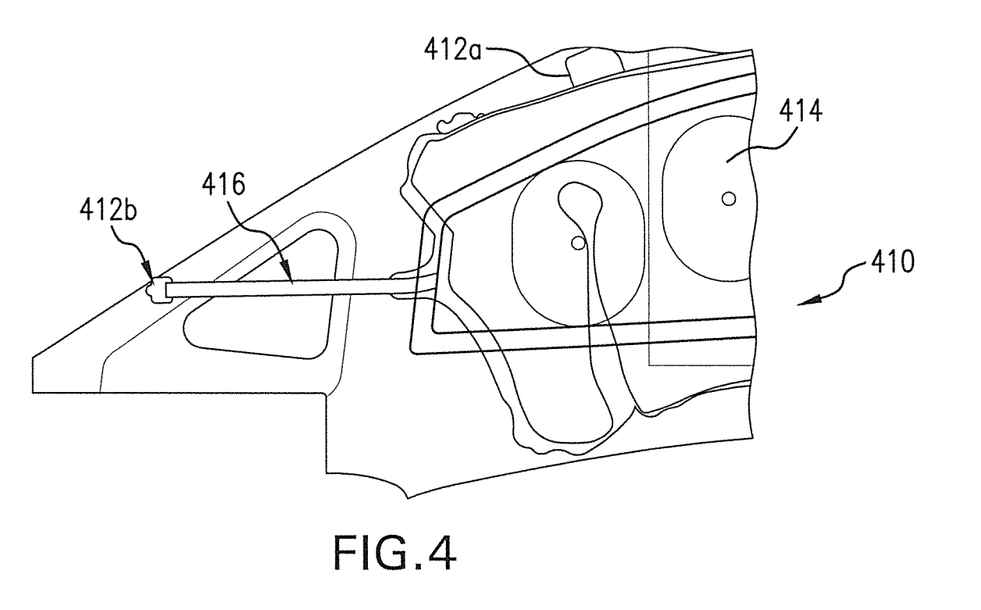
FIG. 4 is a simplified fragmentary perspective view of an interior of a vehicle showing an airbag assembly including airbag mounting brackets in accordance with selected embodiments of the invention and coupled to an inflatable airbag curtain, shown in a deployed or extended configuration or condition

FIG. 4 depicts an interior of a vehicle showing an airbag assembly 410 including airbag mounting brackets 412a and 412b in accordance with selected embodiments of the invention and coupled to an inflatable airbag curtain 414, shown in a deployed or extended configuration or condition.

As will be appreciated by those skilled in the art and guided by the teaching herein provided, the inflatable airbag curtain 414 in such a deployed or extended configuration or condition can desirably serve to protect vehicle occupants or minimize vehicle occupant injury in the event of occurrence of a collision scenario. For example, inflatable curtain airbags are frequently employed to protect the passengers of a vehicle during a side collision or roll-over collision as, for example, the inflatable curtain airbag may desirably expand in a collision scenario along the side of the vehicle between the vehicle passengers and the side structure of the vehicle.

The airbag mounting bracket 412a is of a form or type constituting an airbag hanger bracket. Airbag hanger mounting brackets in accordance in accordance with one aspect of the invention are described more fully below making reference to FIGS. 5-7.

The airbag mounting bracket 412b is of a form or type constituting an airbag tether anchor such as employed in connection with an airbag tether 416 extending between the airbag mounting bracket 412b and the inflatable airbag curtain 414.

Airbag tether anchor mounting brackets in accordance with one aspect of the invention are described more fully below making reference to FIGS. 5-7. More specifically, there is shown an airbag hanger bracket, generally designated by the reference numeral 510. The bracket 510, similar to the bracket 112 described above, includes a base portion 512 provided in a lower part of the bracket 510 and has a horizontally long insertion opening 514. Similar to the bracket 112, a fabric tab connector or like element (not shown) can be passed through the insertion opening 514. As will be described in greater detail below, the insertion opening 514 of the bracket 510 can advantageously function without inclusion of an upwardly curved end at one or both ends of the hole.

A vehicle fixing portion 520 extends upward from the base portion 512 in a rectangular shape. A fastener opening or hole 522 is formed or included in the vehicle fixing portion 520 for use in fastening the airbag hanger bracket 510 to the vehicle such as via a bolt or other selected fastener.

The airbag hanger bracket 510 also includes hooking portions 524a and 524b formed in the vehicle fixing portion 520. The hooking portions 524a and 524b are formed in lateral edges in the width direction of the vehicle fixing portion 520 so as to face the vehicle side. The hooking portions 524a and 524b are positioning portions used when attaching the airbag hanger bracket 510 and can desirably be inserted, such as in the vehicle roof side rail, prior to the fastener (e.g., bolt) being fastened into the fastener opening 522.

The bracket 510, similar to the bracket 112, further includes protruding portions 528a and 528b formed on both sides in the width direction of the vehicle fixing portion 520 in an upper portion of the base portion 512. The protruding portions 528a and 528b have such a shape that protrudes upward from the base portion 512 such that hooking holes of an associated wrapping member can be hooked onto the protruding portions 528a and 528b.

Whereas, as described above, the bracket 112 is commonly formed by applying bending processing or the like to a planar metal and further typically requires coining, cold forming, de-burring, and/or coating or the like to remove or avoid sharp edges that could potentially damage fabric tabs during deployment or throughout their life cycle prior to deployment, the bracket 510 as detailed further below desirably can desirably increase the load bearing surface adjacent the insertion hole 514 and to which an airbag associated fabric tab interfaces. As a result, a bracket in accordance with the invention can minimize and desirably avoid or eliminate the need for coining on the hole/slot and associated failure modes (breakage burrs, tool wear, tool tuning, etc.).

Now making reference to FIGS. 8-11, the making, production, or manufacture of an airbag mounting bracket, in accordance with an aspect of the invention, and such as for use with an attachment component of an associated airbag cushion will be described.

Figure 8:
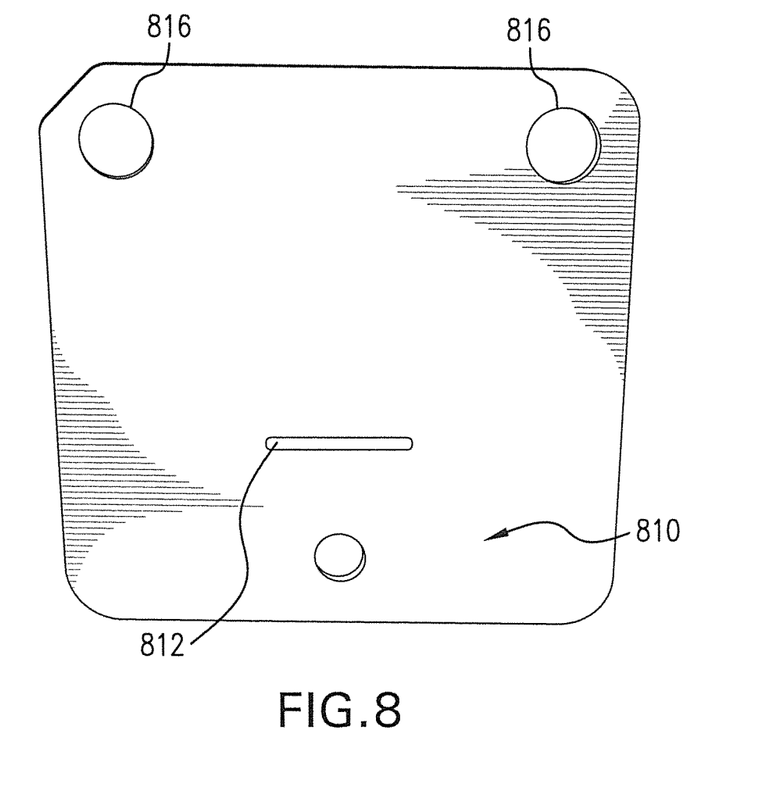
FIGS. 8-11 illustrate selected steps in a process for forming or making an airbag hanger bracket in accordance with one aspect of the invention.

FIG. 8 shows a mounting bracket precursor. e.g., a test airbag mounting bracket blank 810, such as formed of a bracket precursor material, e.g., such as a selected metal. The test airbag mounting bracket blank 810 includes a laser formed opening or slot 812, as a precursor to the eventual insertion opening in the end bracket for use with an attachment component of an associated airbag cushion. That is with further processing such as described below, the opening or slot 812 desirably results in or is processed to form an insertion opening for use with an attachment component of an associated airbag cushion in accordance with a preferred aspect of the invention. Those skilled in the art and guided by the teachings herein provided will understand and appreciate that the broader practice of the invention is not necessarily limited to or by the technique or processing used to form the opening or slot 812 as other processing techniques or methods such as known in the art can, if desired, be utilized to form such slot or opening, e.g., the precursor insertion opening.

In the illustrated embodiment, the mounting bracket precursor 810 also includes processing openings 816 such as included to facilitate handling during the test production process. While the figures and discussion make specific reference to test production of an airbag mounting bracket, those skilled in the art and guided by the teachings herein provided will understand and appreciate that with minor modification(s) such as through the elimination of the need for processing openings (816) and the like, such processing can be applied to commercial manufacture or production.

Figure 9:
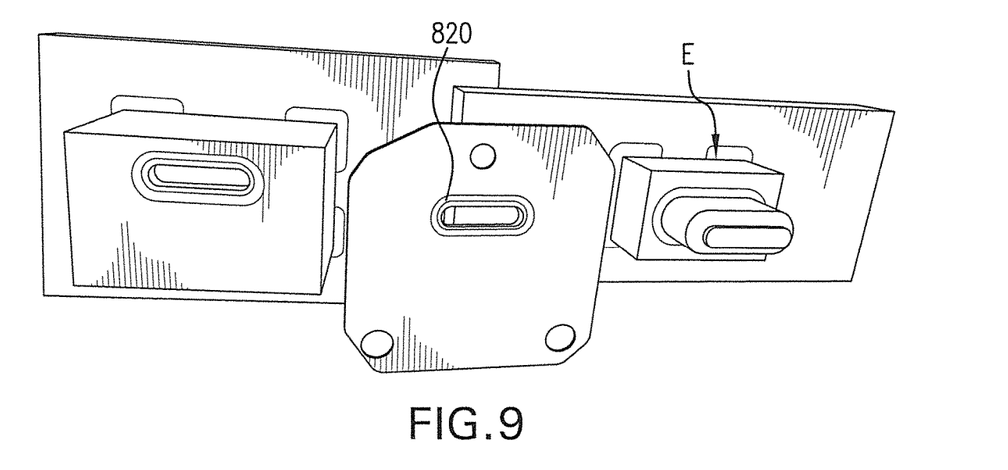

The slot opening 812 is appropriately extruded and rolled, as shown in FIG. 9, such as via compression extrusion assembly generally designated by the reference E, to form a rolled extruded opening 820. That is, the extruded material is rolled to a desired radius such as shown in FIG. 9. This rolled radius desirably serves to provide or result in a smooth continuous surface having or providing an increased or enlarged load bearing surface with which the airbag cushion fabric tab can appropriately contact and interact.

The resulting mounting bracket precursor with the rounded surface can then be appropriately finalized to form or otherwise provide or result in the desired airbag cushion mounting bracket.

Figure 10:
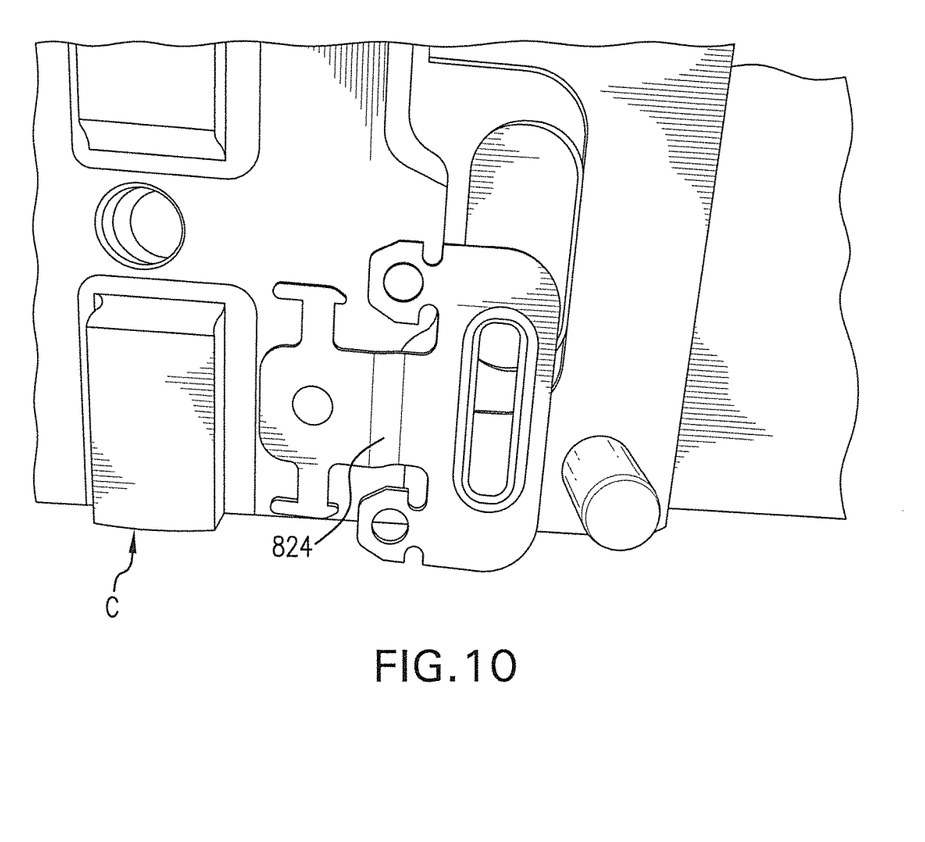

For example, the resulting mounting bracket precursor with the rounded surface opening can be laser cut to have a desired perimeter outline and with an offset 824, such as compressively formed therein via assembly generally designated by the reference C, such as shown in FIG. 10, for example.

Figure 11:
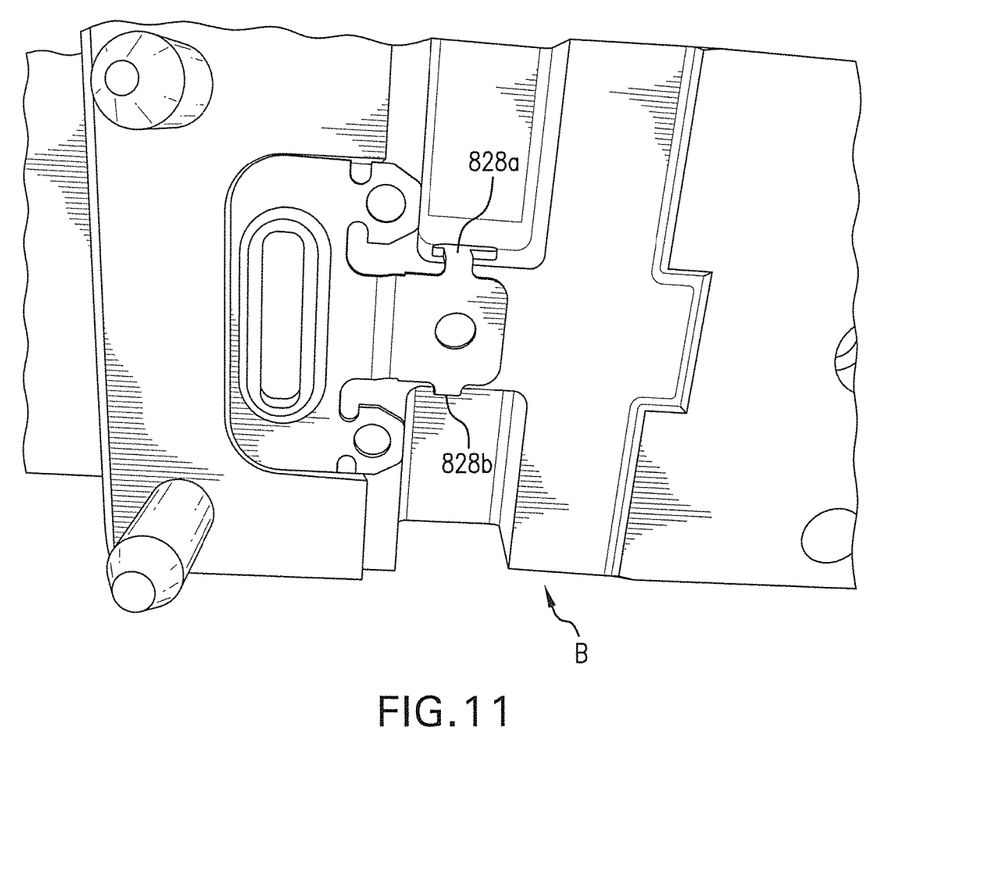

The resulting mounting bracket precursor can then be processed by the forming of the bent hooking portions 828a and 828b such as via an assembly generally designated by the reference B, such as shown in FIG. 11, for example.

As noted above, the mounting bracket precursor and, in turn a mounting bracket in accordance with a preferred embodiment of the invention can advantageously be made or formed by or from an appropriate material such as a selected metal. Moreover, as mounting bracket precursors in accordance with a preferred practice of the invention can desirably undergo work hardening during the fabrication process, metal materials usable in such a production process can desirably include milder or softer steels that previously may not have been commonly utilized in such applications in automotive occupant safety systems. Examples of such useable metal materials desirably can include cold rolled 1008 DS (drawing steel); cold rolled 1008 DDS (deep drawing steel) and cold rolled HSLA grade 50 steel, for example.

While the invention has been described and discussed above making specific reference to an airbag mounting bracket having the shape, form or use as an airbag hanger bracket, those skilled in the art and guided by the teaching herein provided will understand and appreciate that the broader application of the invention is not necessarily so limited. That is, the invention can be applied to other types or forms of airbag mounting bracket.

Figure 12:
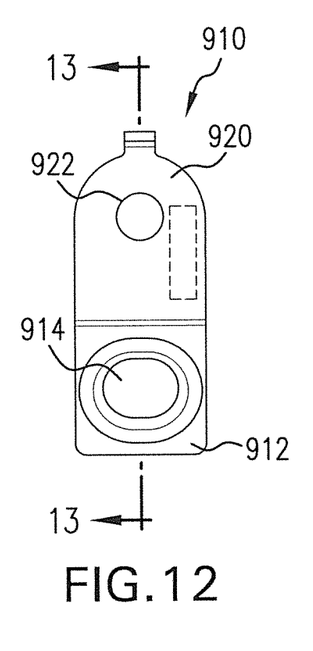
FIG. 12 is a front view an airbag tether anchor form of an airbag mounting bracket in accordance with one aspect of the invention.
Figure 13:
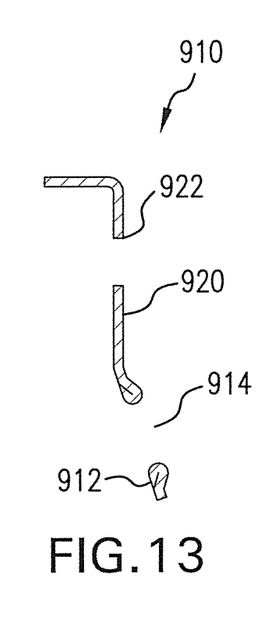
FIG. 13 is a sectional view of the airbag tether anchor shown in FIG. 12 and taken along the line 13-13 shown in FIG. 12.
Figure 14:
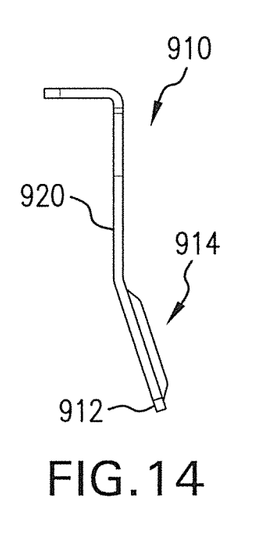
FIG. 14 is a side view of the airbag tether anchor shown in FIGS. 12 and 13.

For example, the invention, if desired and as shown in FIGS. 12-14, can be appropriately applied to airbag mounting brackets having the form of tether anchor brackets.

More specifically, there is shown a tether anchor bracket airbag mounting bracket, generally designated by the reference numeral 910. The bracket 910, similar to the bracket 510 described above, includes a base portion 912 provided in a lower part of the bracket 910 and has an insertion opening 914, here shown as having a generally circular or oval cross sectional form.

A vehicle fixing portion 920 extends upward from the base portion 912 in a generally rectangular shape. A fastener opening or hole 922 is formed or included in the vehicle fixing portion 920 such as for use in fastening the tether anchor bracket 910 to a vehicle such as via a bolt or other selected fastener.

As will be appreciated by those skilled in the art and guided by the teachings herein provided, as a result of the increase in load bearing surface adjacent the insertion hole of subject airbag mounting brackets, such airbag mounting brackets can desirably be employed with airbag cushion fabric tabs of reduced thickness, width and/or other structural dimension(s) such as to improve or otherwise optimize construction. For example, the invention permits fabric tabs having a thickness when compressed of 10.5 mm or less to be utilized in combination with airbag hanger mounting brackets in accordance with the invention. The invention permits tether tabs having a thickness when compressed of 10.5 mm or less to be utilized in combination with airbag tether anchor mounting brackets in accordance with the invention. Moreover, as subject airbag mounting brackets include or incorporate airbag cushion or attachment interfaces which are not dependent on coining manufacture processing such brackets and interface manufacture can desirably minimize and preferably avoid tool wear and complications commonly involved or associated with coining manufacture processing. For example, in the past as the tools have worn, the parts may be left with sharper than desired edges such that tearing of associated fabric tabs may occur during a deployment event. Mounting brackets in accordance with the invention, however, instead utilize an extruded and stamped surface of the bracket to fabric tab interface such as to remain reliably smooth throughout the life of the tooling.

The present invention is described in further detail in connection with the following examples which illustrate or simulate various aspects involved in the practice of the invention. It is to be understood that all changes that come within the spirit of the invention are desired to be protected and thus the invention is not to be construed as limited by these examples.

Examples

Figure 5:
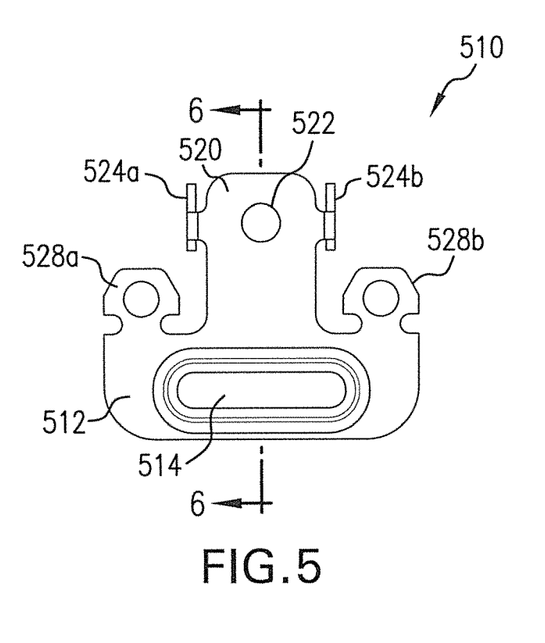
FIG. 5 is a front view of an airbag hanger bracket form of an airbag mounting bracket in accordance with one aspect of the invention.
Figure 6:
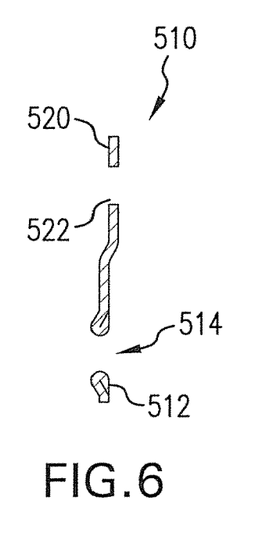
FIG. 6 is a sectional view of the airbag hanger bracket shown in FIG. 5 and taken along the line 6-6 shown in FIG. 5.
Figure 7:
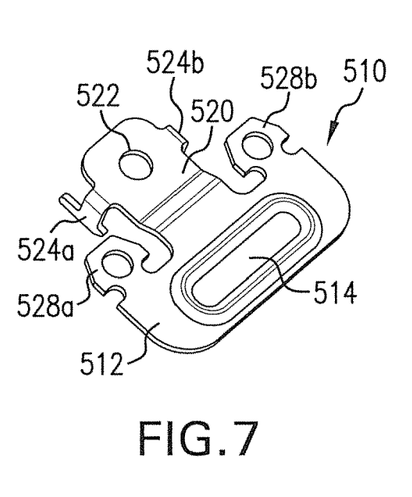
FIG. 7 is a perspective view of the airbag hanger bracket shown in FIGS. 5 and 6.

In these examples, an airbag hanger bracket such as shown in FIGS. 5-7 and having a 1.6 mm non-coined rolled edge slot and a similarly sized and shaped prior art airbag hanger bracket having 1.6 mm slot that was not extruded and roll processed, as in the invention, were tested and compared for a) tab bracket strength via dynamic drop testing performed on brackets with strong webbing to force bracket failure (see Table I) and b) tab assembly strength and failure mode in dynamic drop testing performed utilized fabric tab assemblies (see Table II). Measurements in each case were taken with employing forces at Vertical (e.g., 0°), 45° Inboard (IB), and 45° Side, respectively.

The results are shown in Tables I and II below.

TABLE I

TAB BRACKET STRENGTH RESULTS

| BRACKET | Vertical67 | 45° IB | 45° Side |
|---|---|---|---|
| % increase in Strength from Prior art to Invention | 19% | 44% | 27% |

TABLE II

TAB ASSEMBLY STRENGTH RESULTS

| BRACKET | Vertical | 45° IB | 45° Side |
|---|---|---|---|
| % increase in Strength from Prior Art to Invention | 12% | 8% | 31% |

Moreover, in the dynamic drop testing performed using tab assemblies, the failure mode was observed to shift from the fabric tab in the testing with the prior art tab assembly to the airbag cushion itself, e.g. the one piece woven ("OPW") airbag cushion, in the testing with the with the airbag hanger bracket having a non-coined rolled edge slot in accordance with the invention.

DISCUSSION OF RESULTS

These test results show that in addition to increased reliability of non-coined rolled edge mounting brackets in accordance with the invention, increases in actual bracket and tab assembly strengths can and are desirably realized through the practice of the invention. As a result, a designer can, if desired, seek to optimize features such as the design of the connecting tab for factors such as lower cost or decreased material constructions while still providing an assembly and design that performs as desired.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A method for making an airbag mounting bracket for use with an attachment component of an associated airbag cushion, the method comprising:
   extruding and rolling a slot opening in a mounting bracket precursor formed of a bracket precursor material to form an extruded and rolled opening;
   wherein the mounting bracket precursor with the extruded and rolled opening forms the airbag cushion mounting bracket, and
   wherein the extruded and rolled opening provides an airbag attachment engagement opening for passage of the attachment component of the associated airbag cushion and the extruded and rolled opening provides a smooth continuous surface providing an enlarged load bearing surface of increased area for the attachment component.

2. The method of claim 1 wherein the airbag mounting bracket comprises an airbag hanger bracket.

3. The method of claim 1 wherein the airbag mounting bracket comprises an airbag tether anchor.

4. The method of claim 1 wherein airbag attachment engagement opening is non-coined.

5. The method of claim 1 wherein the associated airbag cushion comprises a side airbag inflatable cushion.

6. An airbag mounting bracket made by the method of claim 1.

7. A combination comprising:
   an airbag mounting bracket made by the method of claim 1 and
   an airbag cushion wherein the attachment component comprises a fabric tab for passage through the airbag attachment engagement opening of the airbag mounting bracket.

8. The combination of claim 7 wherein the airbag mounting bracket comprises an airbag hanger bracket and the fabric tab is of no more than 10.5 mm thick when compressed.

9. The combination of claim 7 wherein the airbag mounting bracket comprises an airbag tether anchor and the fabric tab is of no more than 10.5 mm thick when compressed.

10. The method of claim 1 wherein the attachment component comprises a fabric.

11. A method for making a side airbag inflatable curtain mounting bracket for use with a fabric attachment component of an associated airbag cushion, the method comprising:
   extruding and rolling a slot opening in a mounting bracket precursor formed of a bracket precursor material to form an extruded and rolled opening;
   wherein the mounting bracket precursor with the extruded and rolled opening forms the side airbag inflatable curtain mounting bracket, and wherein the extruded and rolled opening provides a side airbag attachment engagement opening for passage of the fabric attachment component and the extruded and rolled opening provides a smooth continuous surface providing an enlarged load bearing surface of increased area for the attachment component;
   wherein the side airbag inflatable curtain mounting bracket comprises a side airbag inflatable curtain hanger bracket or a side airbag inflatable curtain tether anchor.

12. The method of claim 11 wherein the airbag mounting bracket comprises an airbag hanger bracket.

13. The method of claim 11 wherein the airbag mounting bracket comprises an airbag tether anchor.

14. The method of claim 11 wherein airbag attachment engagement opening is non-coined.

15. The method of claim 11 wherein the associated airbag cushion comprises a side airbag inflatable cushion.

16. An airbag mounting bracket made by the method of claim 11.

17. A combination comprising:
   an airbag mounting bracket made by the method of claim 11 and
   an airbag cushion wherein the attachment component comprises a fabric tab for passage through the airbag attachment engagement opening of the airbag mounting bracket.

18. The combination of claim 17 wherein the airbag mounting bracket comprises an airbag hanger bracket and the fabric tab is of no more than 10.5 mm thick when compressed.

19. The combination of claim 17 wherein the airbag mounting bracket comprises an airbag tether anchor and the fabric tab is of no more than 10.5 mm thick when compressed.

20. A method for making an airbag mounting bracket for use with an attachment component of an associated airbag cushion, the method comprising: extruding and rolling a slot opening in a mounting bracket precursor formed of a bracket precursor material to form an extruded and rolled opening, wherein the extruded and rolling opening provides an airbag attachment engagement opening for passage of an attachment portion of an associated airbag cushion and the extruded and rolled opening provides a smooth continuous surface providing an enlarged load bearing surface of increased area for the attachment component; and finalizing the mounting bracket precursor having the extruded and rolled opening to form the airbag cushion mounting bracket.

* * * * *